US008671542B2

(12) United States Patent
Lanzafame

(10) Patent No.: US 8,671,542 B2
(45) Date of Patent: Mar. 18, 2014

(54) SHOULDER PROTECTION PAD FOR LADDERS WITH HOLLOWS TO ACCOMMODATE RUNG ENDS AND RIVETS

(75) Inventor: Philip F Lanzafame, Poulsbo, WA (US)

(73) Assignee: Philip F. Lauzafame, Poulsbo, WA (US)

( * ) Notice: Subject to any disclaimer, the term of this patent is extended or adjusted under 35 U.S.C. 154(b) by 202 days.

(21) Appl. No.: 12/799,138

(22) Filed: Apr. 19, 2010

(65) Prior Publication Data

US 2010/0263189 A1 Oct. 21, 2010

Related U.S. Application Data

(60) Provisional application No. 61/212,955, filed on Apr. 20, 2009.

(51) Int. Cl.
*E06C 5/32* (2006.01)
*B65G 7/00* (2006.01)

(52) U.S. Cl.
USPC .............. 29/428; 182/129; 224/264; 224/265

(58) Field of Classification Search
USPC ...................... 182/129; 224/265, 264; 29/428
See application file for complete search history.

(56) References Cited

U.S. PATENT DOCUMENTS

| | | | | |
|---|---|---|---|---|
| 5,058,789 | A * | 10/1991 | Piper | 224/265 |
| 5,207,364 | A | 5/1993 | Johnson | |
| 5,972,453 | A * | 10/1999 | Akiwa et al. | 428/40.1 |
| 6,189,752 | B1 | 2/2001 | Perry | |
| 6,453,523 | B1 * | 9/2002 | Teidemann | 24/546 |
| 6,786,371 | B2 * | 9/2004 | Horneman | 224/264 |
| 2002/0046904 | A1 * | 4/2002 | Richard | 182/129 |
| 2004/0036064 | A1 * | 2/2004 | Takagi et al. | 256/65.02 |

* cited by examiner

*Primary Examiner* — Peter DungBa Vo
*Assistant Examiner* — Anthony Green

(57) ABSTRACT

A shoulder pad or shoulder cushion that can be affixed to the outside face of any ladder rail, regardless of shape, size, length, or material. One face of the pad is made to allow for easy and quick permanent attachment to the rail by way of self-adhesive, double-stick tape or other adhesive that enables the installer to simply and quickly affix the pad to the ladder in a matter of just a few seconds. The same side is hollowed out, or routed out, to allow ladder rung protrusions, rivets, or rung attachment plates to remain recessed inside the shoulder pad without interference to the adhesive edges of the pad. The hollow may be formed by the protrusion pushing into a thin layer of soft material of lower resilience than an adhered thicker layer.

11 Claims, 6 Drawing Sheets

SHOULDER PROTECTION PAD FOR LADDERS WITH HOLLOWS TO ACCOMMODATE RUNG ENDS AND RIVETS

The present application claims the benefit of U.S. Provisional Patent Application Ser. No. 61/212,955, filed Apr. 20, 2009, which application is incorporated herein by reference in its entirety.

BACKGROUND

FIG. 8 shows various ladder rung attachment methods in the prior art. Rungs 2 are attached to a ladder rail 1 forming protrusions on the outer, otherwise smooth, surface of the ladder rail. The attachments may include a rung-end flange 3 or a plate 4 or rivets 5. If one adheres a shoulder pad to the outside of the rail and the pad is sufficiently resilient to be effective to cushion the weight of the ladder on a shoulder, the protrusions tend to push the pad away from the rail, placing the adhesive in tension with crack propagation beside the protrusion. Most adhesives cannot withstand such constant tensile force with crack propagation and will fail over time.

There have been various types of shoulder pad and shoulder cushion inventions for ladder rails in the past. Most were a type that allowed the shoulder pad to be attached and then detached, with various types of connectors, clips or hook and loop (Velcro) devices. Others that were attached with adhesives were short enough to fit between rungs (typically about 8 inches, possibly up to 10½ inches) so that the adhesion would not be compromised by the pad extending over a protrusion such as a rung end. Extending the pad to longer than 12 inches, the typical center-to-center distance between rungs, makes a more effective and useful pad.

SUMMARY OF THE INVENTION

This invention is for individuals who need a cushion to protect their shoulders when carrying the ladder from one point to another. It is a low cost, easy to manufacture item that is also easy to install on most ladder rails in a matter of seconds. This product is designed to be a permanently installed shoulder pad accessory that can either be pre-installed at the ladder factory or it can be quickly installed, as an after market product, by a ladder user who already owns a ladder and wants shoulder protection. If it wears off, it can be easily replaced with a new one by cleaning the surface of the rail and attaching another one in its place.

The present invention is a pad that has or forms one or more hollows within a surface that is otherwise flat and coated with self-adhesive tape for instantaneous adhesion or installation onto the ladder rail. No fasteners or clips are needed, although they may be employed instead of or in addition to adhesive. The preferred pad sticks on and stays on with a typical adhesive that adheres to fiberglass or aluminum ladder rails.

In one aspect, the invention is a method for padding a ladder for carrying on a shoulder using a pad with a soft, resilient shoulder contact side and a rail contact side, a length between 8 and 30 inches, a width between 2 and 4 inches, and a thickness between ¼ inch and 4 inches. The rail contact side of the pad includes at least one hollow to receive at least one protrusion and allow the rail contact side of the pad to contact the flat surface of the rail while covering at least one protrusion. One affixes the pad to the outer side of the rail so that the pad covers at least one protrusion disposed within a hollow in the pad. The protrusions may be rung ends or rivets or rung attachment plates or any other protrusion.

In one embodiment, the rail contact side of the pad has a perimeter and none of the one or more hollows extends through the perimeter such that the entire perimeter contacts the rail when the pad is affixed to the rail. In other embodiments, at least one of the one or more hollows extends through the perimeter such that the entire perimeter does not contact the rail when the pad is affixed to the rail.

The hollows may extend through the perimeter at ends of the pad or along the width of the pad.

The pad and hollows may be formed by lengthwise extrusion or by widthwise extrusion. The pad may be formed with uniform thickness and then the hollow is formed by cutting or thermo-melting the pad. The pad and hollows may be formed by thermo-molding.

The pad may be formed to have at least one hollow on the rail contact side by adhering a soft layer without a hollow to a plate with outer dimensions equal to the soft layer, a thickness equal to or greater than protrusions, and at least one hollow to receive at least one protrusion. The soft layer is adhered to the plate to form the pad and the plate is adhered to the outer side of the rail so that the pad covers at least one protrusion disposed within a hollow in the pad. The plate may be formed of metal, thermoplastic, molded and cured paste, or wood. With such a plate incorporated into the pad, the hollows may be disposed in the plate to form a cantilever over protrusions at each end of the pad.

In another aspect, the invention is a method for padding a ladder for carrying on a shoulder using a pad formed of two layers, a length between 8 and 30 inches and a width between 2 and 4 inches wherein a first shoulder contact layer of the pad comprises a soft material at least one-quarter inch thick having a first resilience and a second rail contact layer of the pad comprises material at least one-eighth inch thick of lower resilience than the shoulder contact layer. One adheres the rail contact layer of the pad to the outer side of the rail with an adhesive so that the pad covers at least one protrusion disposed within a hollow in the rail contact layer which hollow is formed by the protrusion. The rail contact layer has a low enough resilience, sometimes called "memory foam" or "gel", that it applies very low tensile force to the adhesive. Yet the layer of higher resilience provides needed padding for the shoulder.

DETAILED DESCRIPTION

Figure 1:
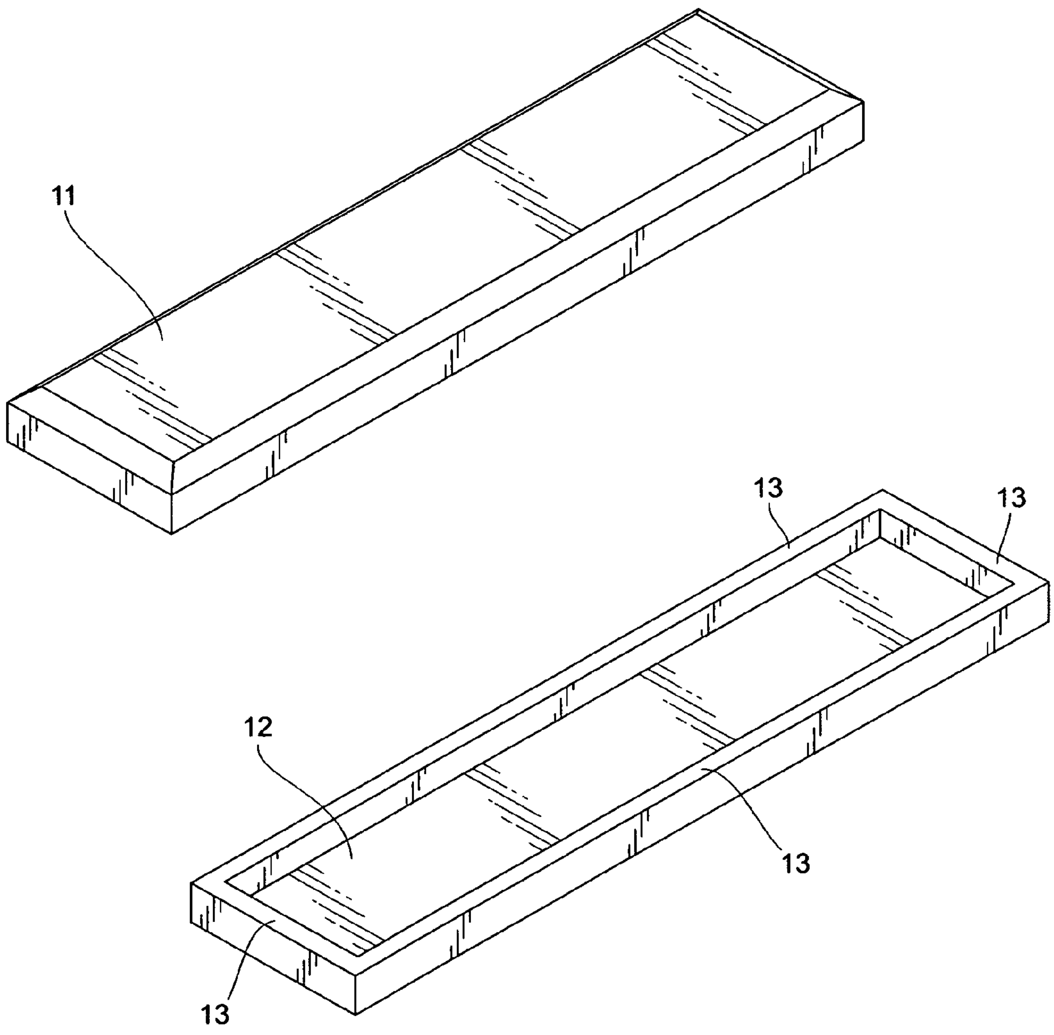
FIG. 1 shows a pad where the hollow does not extend through the perimeter.

The non-adhesive side of the shoulder pad is the side that comes into contact with the ladder carrier's shoulder. The shape can vary but the preferred embodiment has chamfered edges as shown in FIG. 1 to prevent catching on clothes and to make the pad more comfortable.

The pad can be all one material, molded or cut to be the correct and most desirable shape, or it can consist of a waterproof layer wrapped around a piece of cushioning material. The pad is at least 8 inches in length. It can be as long as the ladder rail, but typically there is no good reason for it to extend more than 30 inches in length. It is at least ¼" thick and there is no reason to make it more than 4 inches thick. It is also at least 2" wide and no wider than the ladder rail, typically no wider than 4 inches wide.

The surface of the pad that comes into contact with the carrier's shoulder can be flat and somewhat rigid or it can be curved and soft or a combination of all these qualities. It can be any color or material that can be used as a cushioning unit. The preferred pad is made of polyethylene foam or of EVA foam that slowly conforms to the shape of the ladder carrier's shoulder when the weight of the ladder is on the shoulder. A name may be embossed into the foam material for name brand recognition.

In a preferred embodiment, the pad is permanently attached, without fasteners, and is low cost due to its simplicity of design. The market appeal stems from the need for a low cost shoulder cushion that is quick and easy to install and is always with the ladder so it does not get lost, stolen or protrude too far away from the rail, thereby altering the balance point of the ladder. This invention allows for a durable, comfortable pad to be quickly and permanently installed on a ladder rail while maintaining a low profile in order to minimize any balancing or awkward ladder carrying issues. The outer surface of the shoulder pad is designed to be as close as possible to the ladder rail.

FIG. 1 shows a pad 11 where the hollow does not extend through the perimeter 13.

Figure 2:
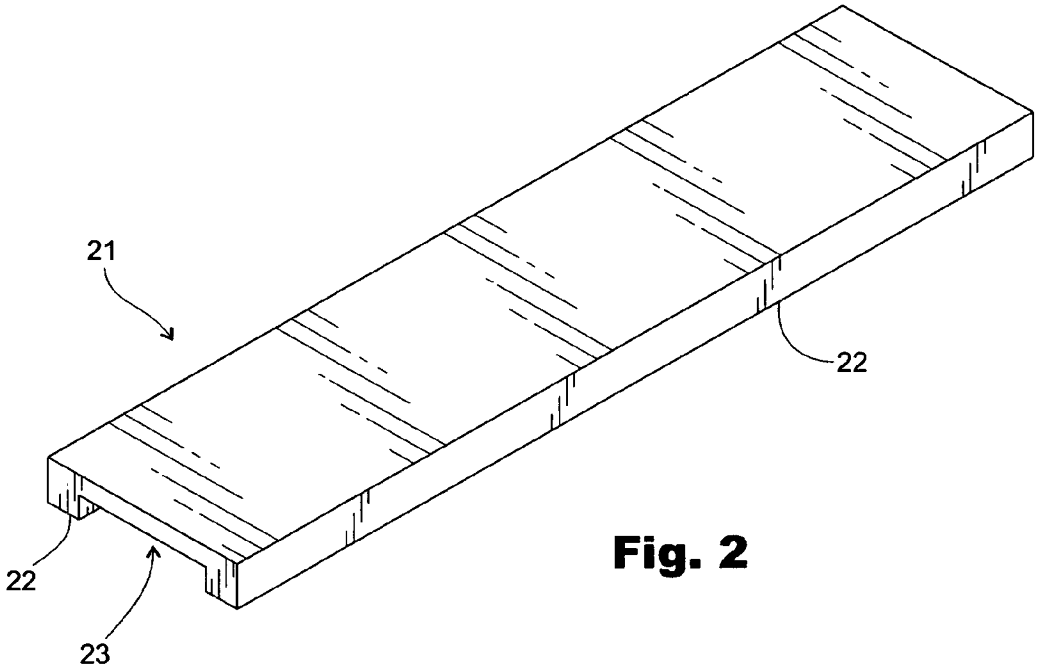
FIG. 2 shows a pad where the hollow extends through each end of the perimeter.

FIG. 2 shows a pad 21 where the hollow 23 extends through each end of the perimeter, resulting in two linear rail contact surfaces 22. It may be made by lengthwise extrusion.

Figure 3:
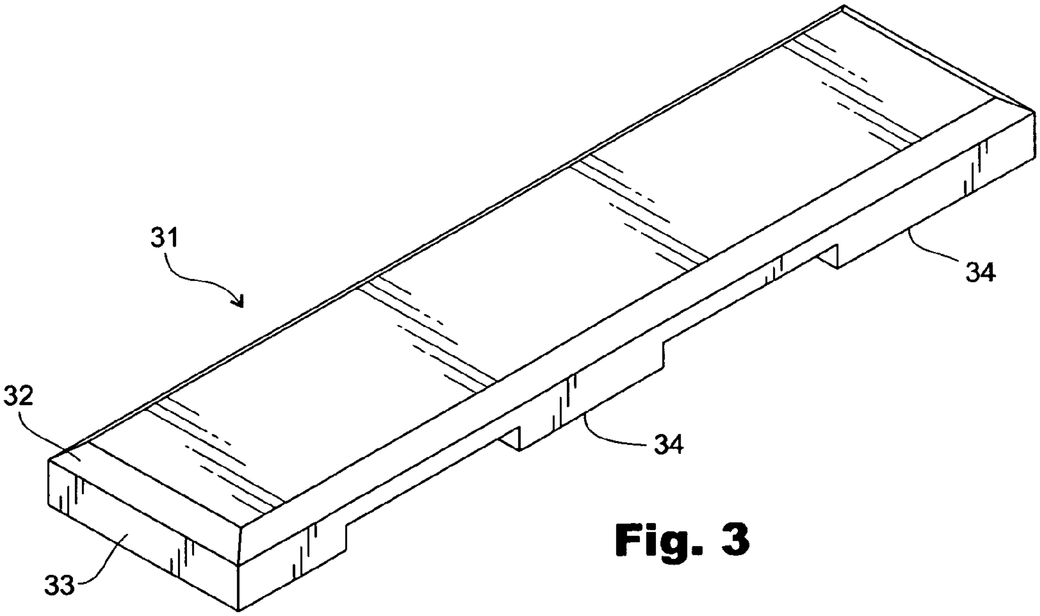
FIG. 3 shows a pad where hollows extend through each side of the perimeter.

FIG. 3 shows a pad 31 where hollows extend through each side of the perimeter to form broad teeth-like rail contact surfaces 34. The perimeter has ends 33 that contact the rail surface. The preferred form includes a chamber 32.

Figure 4:
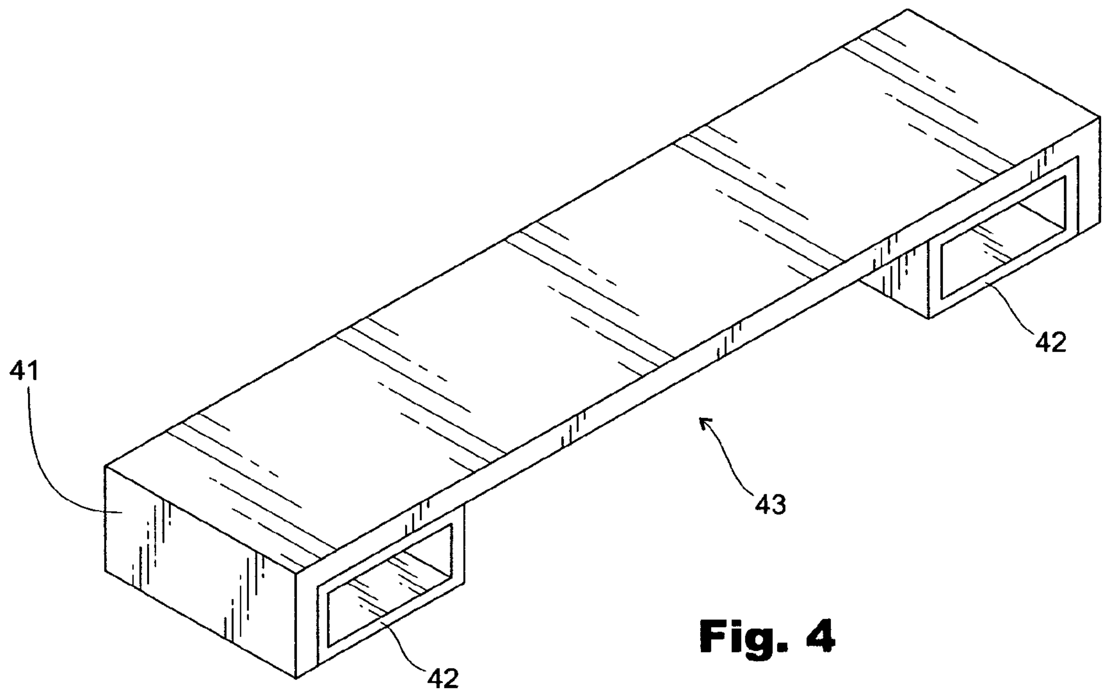
FIG. 4 shows a pad supported by a plate supported by blocks.

FIG. 4 shows a pad 43 supported by a plate (not shown) supported by blocks 42. The foam pad may curve around outer ends of the blocks 42. The blocks 42 may be made as an integral part of the plate (not shown) or as separate pieces to be assembled.

Figure 5:
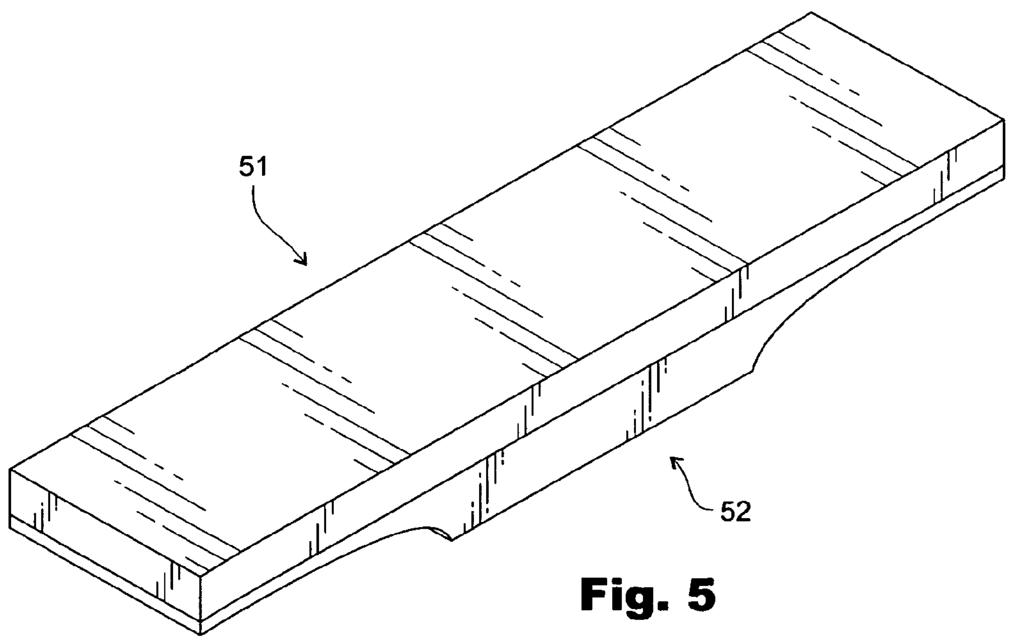
FIG. 5 shows a pad where hollows extend through each side of the perimeter at the ends and through the ends forming cantilevers.

FIG. 5 shows a pad where hollows extend through each side of the perimeter at the ends and through the ends forming cantilevers to extend over protrusions such as rung ends. The cantilever is formed in a stiff plate-like layer 52 which is then covered with a foam layer 51 of equal horizontal dimensions.

Figure 6:
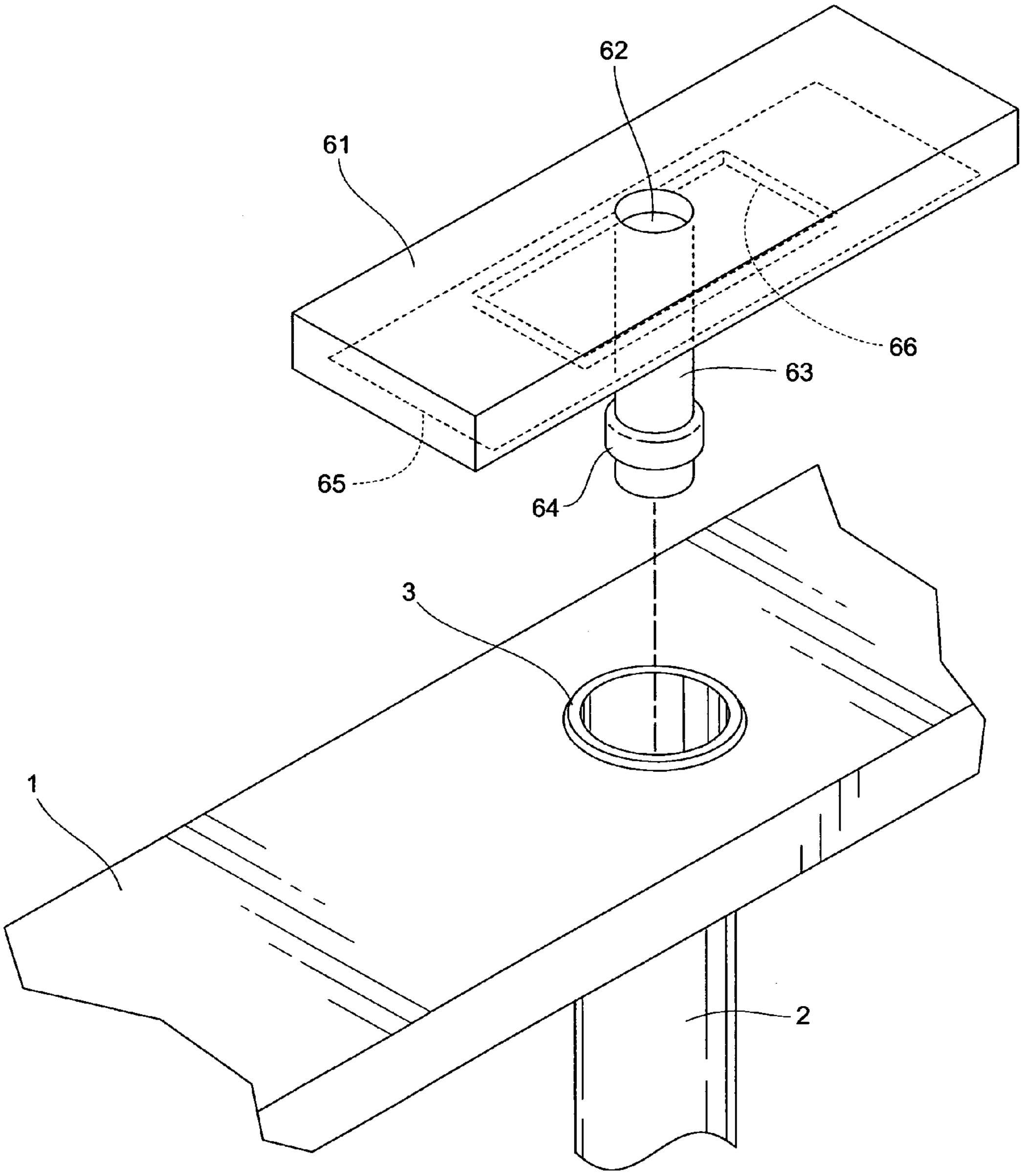
FIG. 6 shows a pad with a central hollow and an inside-the-rung attachment.

FIG. 6 shows a quickly detachable pad 61 with an inside-the-rung attachment pole 63. The pole 63 includes a gripper 64 that is released when a button 62 that is recessed into the outer surface of the pad is pressed. The pole 63 is attached to a plate 65 which is bent forming edges 66 surrounding a hollow that accommodates the rung-end flange 3. The pad of FIG. 6 may be up to 11 inches long with a single hollow. Preferably, it is more than 13 inches long and includes two or three hollows to accommodate rung ends.

Figure 7:
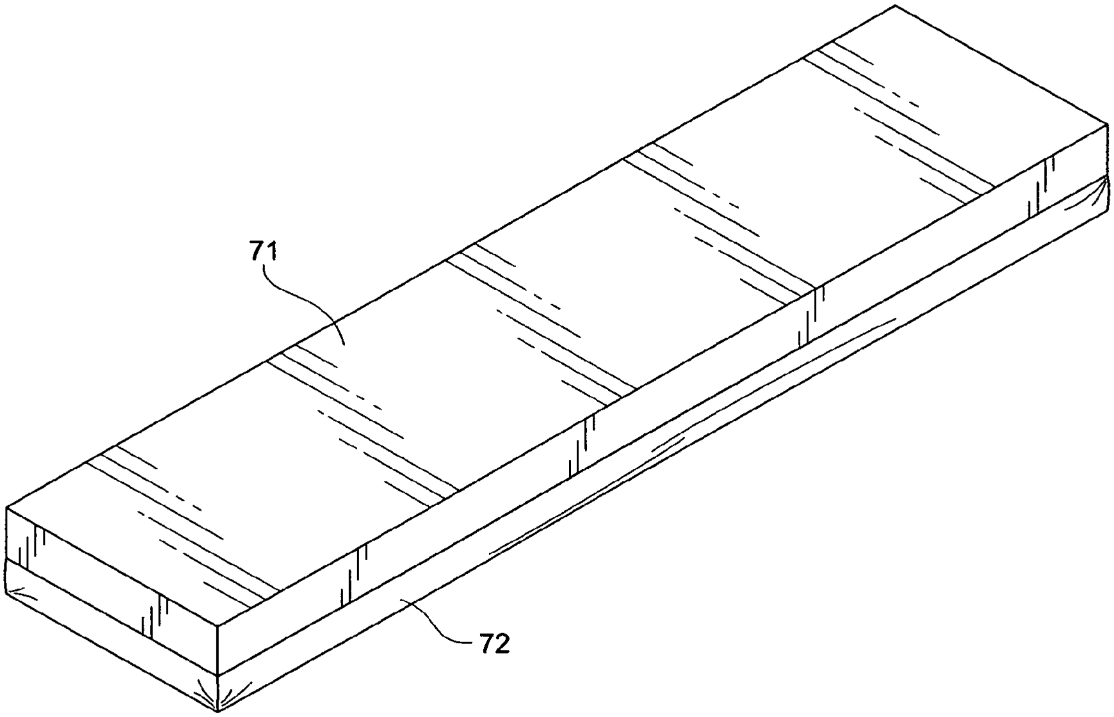
FIG. 7 shows a pad made with a more resilient layer for shoulder contact and a less resilient layer for adhering to a ladder rail and conforming to protrusions.
Figure 8:
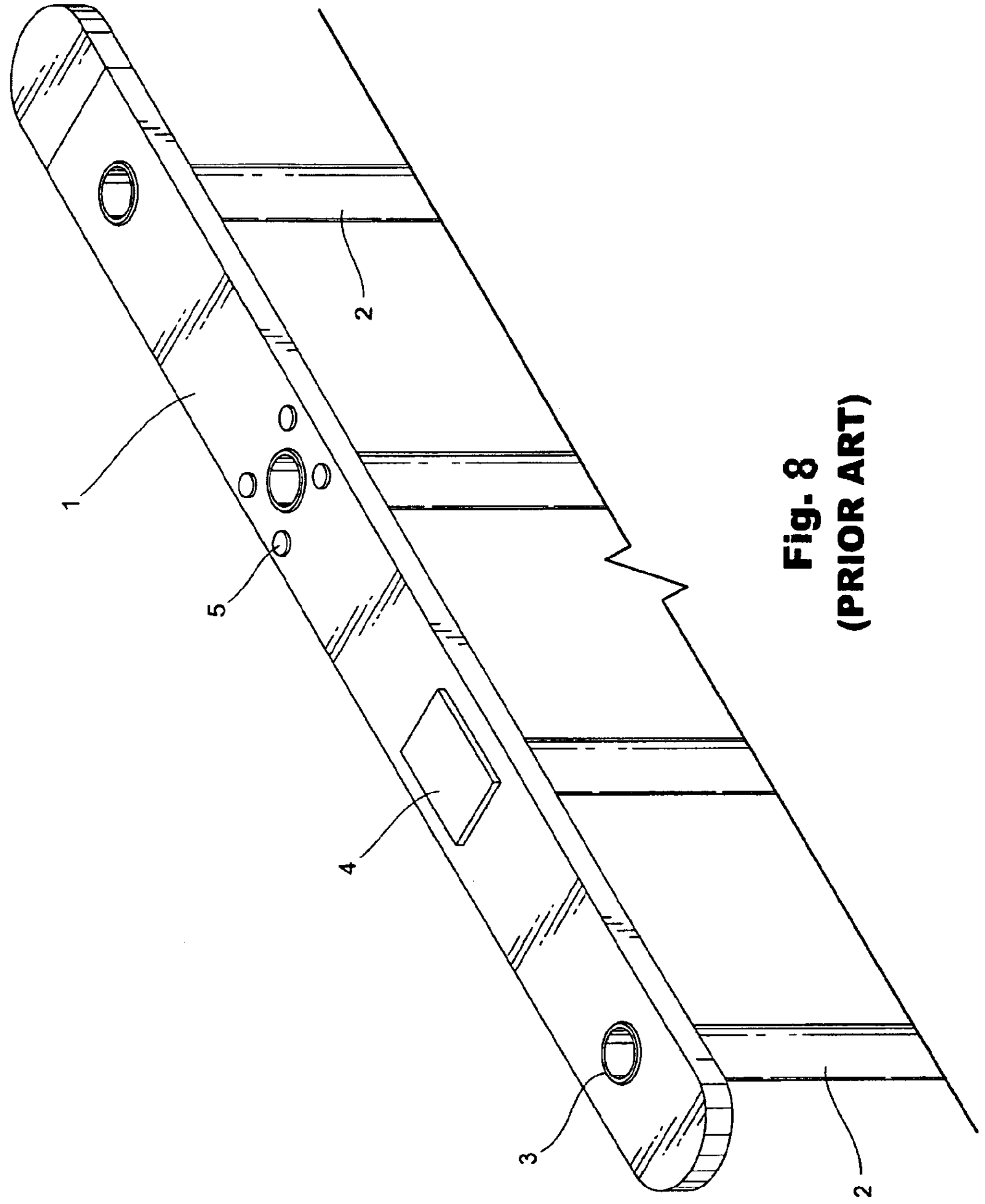
Fig. 8 (PRIOR ART)
FIG. 8 shows prior art.

FIG. 7 shows a pad formed of two layers, a length between 8 and 30 inches and a width between 2 and 4 inches. The preferred length is between 13 and 24 inches. A first shoulder contact layer 71 comprises a soft material at least one-quarter inch thick having a first resilience and a second rail contact layer 72 comprises material at least one-eighth inch thick of lower resilience than the shoulder contact layer. The preferred thickness of the lower resilience layer is one-quarter inch. The preferred thickness of the higher resilience layer is ¼ inch for ladders with no flange on an outer corner (typical for fiberglass) plus additional thickness equal to the flange for ladders with a flange (typical for aluminum).

One adheres the rail contact layer 72 to the outer side of the rail 1 with an adhesive so that the pad covers at least one protrusion disposed within a hollow in the rail contact layer 72 which hollow is formed by the protrusion. The rail contact layer has a low enough resilience, the layer sometimes called "memory foam" or "gel", that it applies very low tensile force to the adhesive. The lower resilience layer may be an open-cell foam so that air can leak out of squashed foam cells. The layer of higher resilience 71, which is preferably a closed-cell foam, provides needed padding for the shoulder.

The invention claimed is:

1. A method for padding a ladder for carrying on a shoulder, comprising:

a. having a ladder with at least two rails, each rail having an outer side and an inner side, each outer side having a flat surface with protrusions, each rail outer side having a rail outer side width and being coupled to two flanges, each flange having a length, an exterior flat surface, and an interior flat surface, the exterior flat surface of each flange being perpendicular to the flat surface of the outside of the rail to which the flange is coupled;

b. having a pad that is complete with all components for attaching to a ladder with a soft, resilient shoulder contact side and a rail contact side, the pad having a maximum width less than or equal to the rail outer side width, a length at least 8 inches, and a thickness between ¼ inch and 4 inches, the rail contact side of the pad having a perimeter equal to twice the length plus twice the maximum width, the perimeter being entirely in one plane;

c. the rail contact side of the pad including at least one hollow in the plane of the perimeter of the rail contact side to receive at least one protrusion and allow the rail contact side of the pad to contact the flat surface of the rail outer side without extending beyond the width of the rail outer side while covering at least one protrusion, and none of the one or more hollows extends through the perimeter such that the entire perimeter of the pad contacts the flat surface of the rail when the pad is affixed to the rail; and d. adhering the pad with the adhesive to the outer side of the rail so that the pad covers at least one protrusion disposed within a hollow in the pad and there is no gap between the rail and the perimeter of the contact side of the pad and the ladder can be rested lengthwise on a horizontal flat surface with the entire length of one flange exterior surface of each rail held by gravity against the horizontal flat surface without the pad pressing on the flat surface.

2. The method of claim 1 wherein the protrusions comprise at least one of rung ends or rivets or plates.

3. The method of claim 1 wherein:

a. the pad is formed to have at least one hollow on the rail contact side by adhering a soft layer without a hollow to a plate with outer dimensions equal to the soft layer, a thickness equal to or greater than protrusions, and at least one hollow to receive at least one protrusion and allow the rail contact side of the pad to contact the flat surface of the rail while covering at least one protrusion; and b. the soft layer is adhered to the plate to form the pad and the plate is adhered to the outer side of the rail so that the pad covers at least one protrusion disposed within a hollow in the pad.

4. The method of claim 3 where the plate comprises at least one of metal, thermoplastic, molded and cured paste, and wood.

5. The method of claim 1 wherein the at least one hollow is formed by cutting the pad to include at least one hollow.

6. The method of claim 1 wherein the at least one hollow is formed by thermo-melting the pad to include at least one hollow.

7. The method of claim 1 wherein the at least one hollow is formed by thermo-molding the pad to include at least one hollow.

8. The method of claim 1 wherein the pad is at least 12 inches long.

9. A method for padding a ladder for carrying on a shoulder, comprising:

a. having a ladder with at least two rails, each rail having an outer side and an inner side, each rail outer side having a flat surface with protrusions, each rail outer side having a rail outer side width and being coupled to two flanges, each flange having a length, an exterior flat surface, and an interior flat surface, the exterior flat surface of each flange being perpendicular to the flat surface of the outside of the rail to which the flange is coupled;

b. having a pad that is complete with all components for attaching to a ladder formed of two layers, a length of at least 8 inches and a maximum width less than or equal to the rail outer side width, a rail contact side of the pad having a perimeter equal to twice the length plus twice the maximum width, the perimeter being entirely in one plane;

c. a first shoulder contact layer of the pad comprising a soft material at least one-quarter inch thick having a first resilience;

d. a second rail contact layer of the pad comprising material at least one-eighth inch thick of lower resilience than the shoulder contact layer; and e. adhering the rail contact layer of the pad to the outer side of the rail with an adhesive that is applied only to the entire perimeter of the pad so that the pad covers at least one protrusion disposed within a hollow in the rail contact layer which hollow is formed in the plane of the perimeter of the rail contact side by the protrusion and none of the one or more hollows extends through the perimeter such that the entire perimeter contacts the rail and there is no pap between the perimeter and the rail when the pad is affixed to the rail outer side without extending beyond the width of the rail outer side such that the ladder can be rested lengthwise on a flat horizontal surface with the entire length of one flange exterior surface of each rail held by gravity against the flat horizontal surface without the pad pressing on the flat horizontal surface.

10. The method of claim 9 wherein the protrusions comprise at least one of rung ends or rivets or plates.

11. The method of claim 9 wherein the pad is at least 12 inches long.

* * * * *